United States Patent
Hashimoto

(10) Patent No.: US 9,426,364 B2
(45) Date of Patent: Aug. 23, 2016

(54) IMAGE PROCESSING APPARATUS AND IMAGE PROCESSING METHOD

(75) Inventor: Mitsuo Hashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 295 days.

(21) Appl. No.: 14/125,555

(22) PCT Filed: Feb. 16, 2012

(86) PCT No.: PCT/JP2012/053657
§ 371 (c)(1),
(2), (4) Date: Dec. 11, 2013

(87) PCT Pub. No.: WO2013/035353
PCT Pub. Date: Mar. 14, 2013

(65) Prior Publication Data
US 2014/0132707 A1    May 15, 2014

(30) Foreign Application Priority Data

Sep. 5, 2011    (JP) .................................. 2011-192930

(51) Int. Cl.
| | | |
|---|---|---|
| H04N 5/00 | (2011.01) | |
| H04N 5/232 | (2006.01) | |
| G01C 3/06 | (2006.01) | |
| G06T 7/00 | (2006.01) | |
| G06K 9/00 | (2006.01) | |
| G06T 7/20 | (2006.01) | |
| H04N 7/18 | (2006.01) | |

(Continued)

(52) U.S. Cl.
CPC ............. *H04N 5/23238* (2013.01); *G01C 3/06* (2013.01); *G01C 3/14* (2013.01); *G06K 9/00791* (2013.01); *G06K 9/00805* (2013.01); *G06T 7/0075* (2013.01); *G06T 7/20* (2013.01); *H04N 7/181* (2013.01); *H04N 13/0239* (2013.01); *G06T 2207/20132* (2013.01); *G06T 2207/30261* (2013.01)

(58) Field of Classification Search
CPC .... B60R 1/00; B60R 2300/105; B60R 11/04; B60R 2300/802; H04N 7/181
See application file for complete search history.

(56) References Cited

U.S. PATENT DOCUMENTS

| | | | |
|---|---|---|---|
| 5,424,952 A | 6/1995 | Asayama | |
| 7,659,921 B2 | 2/2010 | Aoyama | |
| 9,191,690 B2 * | 11/2015 | Eireiner | ................. B60K 37/06 |

(Continued)

FOREIGN PATENT DOCUMENTS

| | | |
|---|---|---|
| CN | 101447019 | 6/2009 |
| JP | 6-281455 A | 10/1994 |

(Continued)

*Primary Examiner* — Jay Au Patel
*Assistant Examiner* — Frank Huang
(74) *Attorney, Agent, or Firm* — Birch, Stewart, Kolasch & Birch, LLP

(57) ABSTRACT

An image processing apparatus comprises: first and second image capturing units with wide angle lenses which capture at least partly overlapping images; a vehicle speed detecting unit that detects the speed of a local vehicle; and a distance measuring unit that calculates the distance from the local vehicle to an object on the basis of a plurality of images captured by the first and second image capturing units. The higher the speed detected by the vehicle speed detecting unit is, the smaller the distance measuring unit makes the size of the pixel areas of the images output from the first and second image capturing units.

12 Claims, 12 Drawing Sheets

(51) Int. Cl.
*H04N 13/02* (2006.01)
*G01C 3/14* (2006.01)

(56) References Cited

U.S. PATENT DOCUMENTS

| | | | |
|---|---|---|---|
| 2003/0122930 A1* | 7/2003 | Schofield | B60R 1/00 348/148 |
| 2003/0222793 A1* | 12/2003 | Tanaka | B60Q 9/004 340/932.2 |
| 2005/0125108 A1* | 6/2005 | Kwon | G01C 21/08 701/1 |
| 2005/0231341 A1* | 10/2005 | Shimizu | B60Q 9/005 340/436 |
| 2007/0241870 A1* | 10/2007 | Ohmura | G01S 7/412 340/435 |
| 2008/0164985 A1* | 7/2008 | Iketani | G01S 7/4802 340/435 |
| 2008/0231703 A1* | 9/2008 | Nagata | H04N 7/181 348/148 |
| 2009/0174577 A1 | 7/2009 | Nakamura et al. | |
| 2009/0187308 A1* | 7/2009 | Morimitsu | B60R 1/00 701/36 |
| 2010/0156616 A1* | 6/2010 | Aimura | G06T 7/0075 340/436 |

FOREIGN PATENT DOCUMENTS

| | | |
|---|---|---|
| JP | 7-280558 A | 10/1995 |
| JP | 8-136249 A | 5/1996 |
| JP | 11-234701 A | 8/1999 |
| JP | 2000-266539 A | 9/2000 |
| JP | 2002-22830 A | 1/2002 |
| JP | 2004-257837 A | 9/2004 |
| JP | 2004-340840 A | 12/2004 |
| JP | 2005-236493 A | 9/2005 |
| JP | 2007-58282 A | 3/2007 |
| JP | 3917285 B2 | 5/2007 |
| JP | 2007-278869 A | 10/2007 |
| JP | 2007-295113 A | 11/2007 |
| JP | 2008-164338 A | 7/2008 |
| JP | 2009-44597 A | 2/2009 |
| JP | 2009-169847 A | 7/2009 |
| JP | 4457690 B2 | 4/2010 |
| JP | 2010-197186 A | 9/2010 |

* cited by examiner

IMAGE PROCESSING APPARATUS AND IMAGE PROCESSING METHOD

TECHNICAL FIELD

The present invention relates to an image processing apparatus and an image processing method.

BACKGROUND ART

Examining small areas in two images captured by a stereoscopic optical system to detect parts in which the same object appears, calculating the offset of the corresponding positions, and calculating the distance to the object by the principle of triangulation is a previously proposed technique.

For example, the gradation correction apparatus described in Patent Reference 1 performs stereo matching by calculating a city-block distance between small areas in each of two images to obtain their mutual correlation and identify corresponding small areas. The gradation correction apparatus then carries out distance measurements by obtaining three dimensional image information (a distance image) in which the range information obtained from the pixel offsets (parallaxes) arising from the distance to objects is quantified.

The imaging apparatus described in Patent Reference 2 combines images captured by a plurality of cameras, including a super wide angle camera having a field of view of substantially 180°, and displays, on a display means, a multiple-perspective video and a bird's eye view video (with a single viewpoint) from above a vehicle. This imaging apparatus accordingly enables the driver to recognize the situation around the vehicle.

In a position detection apparatus that detects the position of an object to be measured from a pair of images obtained by a stereoscopic image input means, the imaging apparatus described in Patent Reference 3 measures the distance to a point illuminated by light after executing distortion corrections on the left and right image data.

PRIOR ART REFERENCES

Patent References

Patent Reference 1: Japanese Patent Application Publication No. 11-234701 (paragraphs 0009-0015)
Patent Reference 2: Japanese Patent Application Publication No. 2005-236493 (paragraphs 0014-0027)
Patent Reference 3: Japanese Patent Application Publication No. 2008-164338 (paragraphs 0014-0026)

SUMMARY OF THE INVENTION

Problems to be Solved by the Invention

The purpose of the gradation correction apparatus described in Patent Reference 1 is to obtain information about the distance to a vehicle in front of a moving vehicle, so it does not require a wide angle lens capable of imaging the surroundings of the vehicle, and therefore uses a standard angle lens that does not require consideration of lens distortion (distortion aberration). The purpose of the imaging apparatus described in Patent Reference 2 is to assist the driver by displaying an image of the vehicle's surroundings on the display means, so this imaging apparatus requires a wide angle lens that can capture an image of a wider area.

If the gradation correction apparatus described in Patent Reference 1 and the imaging apparatus described in Patent Reference 2 are both mounted on a vehicle to measure distance to a preceding object, which is the purpose of Patent Reference 1, and simultaneously provide assistance in visualizing the vehicle surroundings, which is the purpose of Patent Reference 2, the number of cameras increases and cost problems occur, as well as problems of a lack of installation space.

Patent Reference 3 takes the distortion aberration of a wide angle lens into consideration and performs distortion corrections on the right and left image data. Measurement of the distance to the vehicle preceding a moving vehicle, however, demands instant processing, so the time taken for distortion correction is a problem. Furthermore, if a matching process is carried out on images that have been corrected for distortion, then depending on the accuracy of the distortion correction process, the shapes of an object in a stereoscopic image may differ, possibly reducing the accuracy of the matching process.

The present invention addresses the problems of the prior art described above, with the object of enabling visual recognition of vehicle surroundings and measurement of distance to objects to be accomplished by a single imaging apparatus using wide angle lenses.

Means for Solving the Problem

An image processing apparatus according to one aspect of the invention comprises: a plurality of image capturing units with wide angle lenses for capturing at least partly overlapping images; a vehicle speed detecting unit for detecting a speed of a local vehicle; a distance measuring unit for calculating a distance from the local vehicle to an object imaged by the plurality of image capturing units on a basis of a plurality of images captured by the plurality of image capturing units; and a visual recognition image generating unit for generating a visual recognition image for recognition of conditions near the local vehicle from the plurality of images captured by the plurality of image capturing units. The distance measuring unit further comprises a pixel area determining unit for determining, for the plurality of image capturing units, sizes and positions of corresponding pixel areas in images output from each of the plurality of image capturing units, among all pixels usable for imaging in each of the plurality of image capturing units. The pixel area determining unit makes the size of the pixel areas smaller as the speed detected by the vehicle speed detecting unit becomes faster.

Effect of the Invention

According to one aspect of the invention, visual recognition of vehicle surroundings and measurement of distance to objects can be accomplished by a single imaging apparatus using wide angle lenses.

MODE FOR CARRYING OUT THE INVENTION

Figure 1:
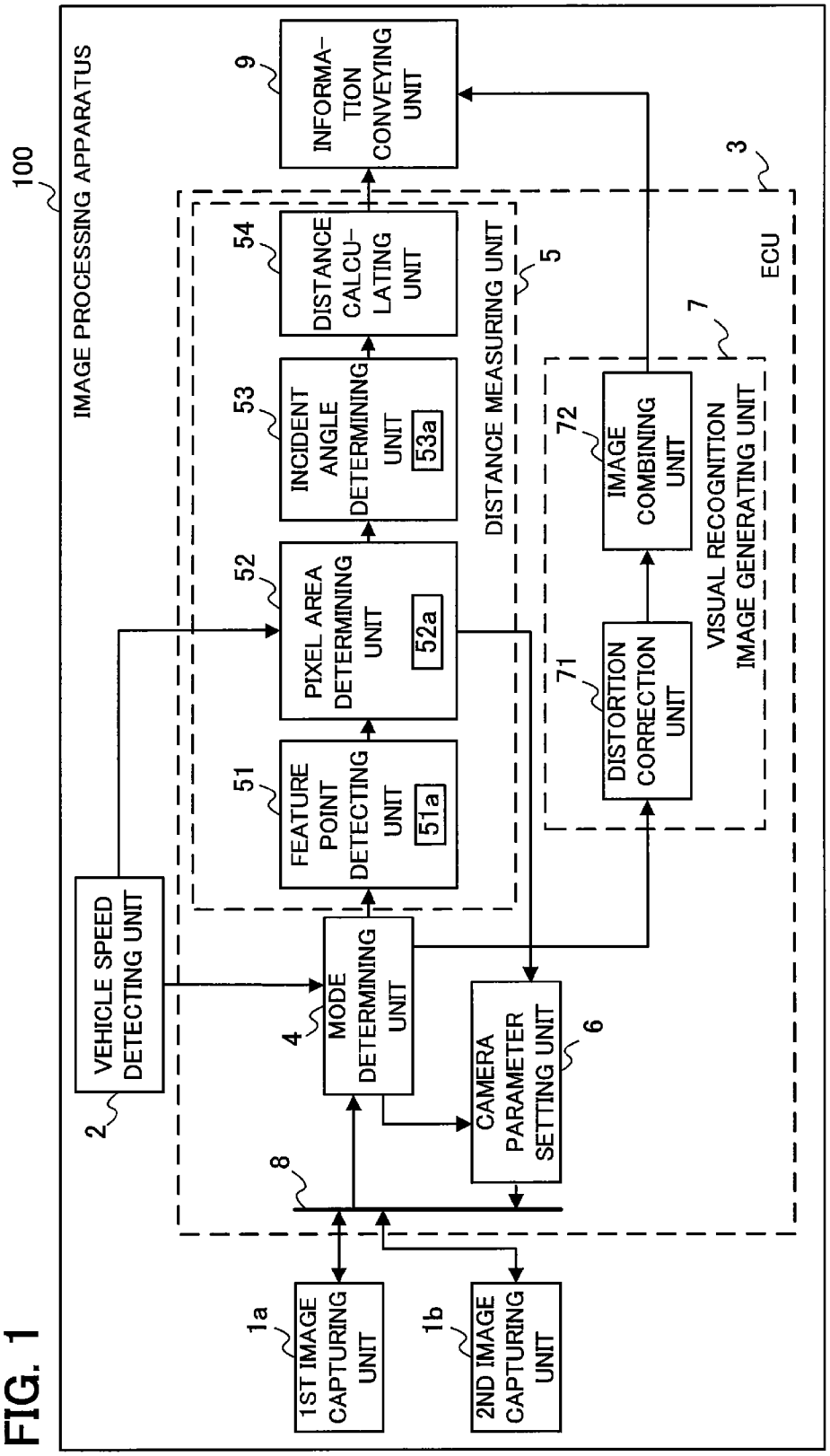
FIG. 1 is a block diagram schematically showing the configuration of an image processing apparatus according to an embodiment of the invention.

FIG. 1 is a block diagram schematically showing the configuration of an image processing apparatus 100 according to an embodiment of the invention. The image processing apparatus 100 includes a first image capturing unit 1a and a second image capturing unit 1b (these image capturing units will be referred to as image capturing unit 1 when there is no particular need to distinguish between them), a vehicle speed detecting unit 2, an ECU (Electronic Control Unit) 3, and an information conveying unit 9. The ECU 3 includes a mode determining unit 4, a distance measuring unit 5, a camera parameter setting unit 6, a visual recognition image generating unit 7, and a data bus 8.

The image capturing unit 1 capture a right and left pair of images that become the source of a stereoscopic image. In this embodiment, the right and left pair of images are captured by two cameras: the first image capturing unit 1a and second image capturing unit 1b. The image capturing unit 1 in this embodiment are installed at the front of a vehicle, and image information pertaining to images captured by the image capturing unit 1 (first image information pertaining to a first image captured by the first image capturing unit 1a and second image information pertaining to a second image captured by the second image capturing unit 1b) is supplied to the mode determining unit 4 through the data bus 8.

Figure 2:
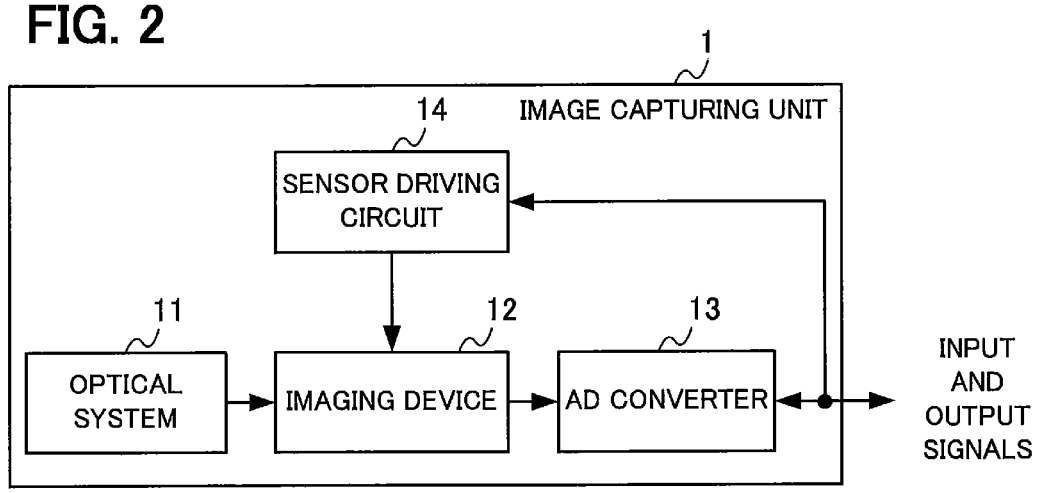
FIG. 2 is a block diagram schematically showing the configuration of the image capturing units.

FIG. 2 is a block diagram schematically showing the configuration of the image capturing unit 1. Each image capturing unit 1 includes an optical system 11, an imaging device 12, an AD converter 13, and a sensor driving circuit 14.

The optical system 11 is a wide angle lens, including either a single lens or a plurality of lenses.

The imaging device 12 converts light obtained from the optical system 11 to analog electric signals. The imaging device 12 may be an imaging device of, for example, either the CMOS (Complementary Metal Oxide Semiconductor) type or the CCD (Charge Coupled Device) type.

The AD converter 13 converts the analog electric signals obtained from the imaging device 12 to digital image information. Incidentally, the AD converter 13 need not necessarily be included in the image capturing unit 1; it may be included in the ECU 3.

The sensor driving circuit 14 changes the driving pulses supplied to the imaging device 12 on the basis of a sensor driving pulse control signal obtained from the camera parameter setting unit 6 to control the size of the image captured by the imaging device 12, as described below.

Returning to the description of FIG. 1, the vehicle speed detecting unit 2 detects the speed of the vehicle (also referred to below as the local vehicle) in which the image processing apparatus 100 is installed. The vehicle speed detecting unit 2 may be a vehicle speed sensor included in the local vehicle, or it may use GPS (Global Positioning System) equipment in a car navigation system to calculate the speed. The speed detected by the vehicle speed detecting unit 2 is supplied to the mode determining unit 4 and distance measuring unit 5.

The mode determining unit 4 determines the operating mode in the image processing apparatus 100 according to the speed of the vehicle obtained from the vehicle speed detecting unit 2. For example, when the vehicle speed is equal to or greater than 10 km/h, the mode determining unit 4 selects a distance measurement mode that informs the driver of the distance to a preceding object (such as another vehicle), and when the vehicle speed is less than 10 km/h, the mode determining unit 4 selects a visual recognition mode that informs the driver of conditions near the local vehicle. Incidentally, the threshold vehicle speed for switching between the distance measurement mode and the visual recognition mode is not limited to 10 km/h. An arbitrary threshold speed may be settable by the user, for example. When the distance measurement mode is selected, the mode determining unit 4 sets the distance measuring unit 5 as the output destination of the image information obtained from the image capturing unit 1 through the data bus 8; when the visual recognition mode is selected, the mode determining unit 4 sets the visual recognition image generating unit 7 as the output destination of the image information.

The distance measuring unit 5 calculates the distance to an object in front of the local vehicle on the basis of the image information supplied from the mode determining unit 4. The distance measuring unit 5 includes a feature point detecting unit 51, a pixel area determining unit 52, an incident angle determining unit 53, and a distance calculating unit 54.

The feature point detecting unit 51 detects a feature point that forms part of a single object that occurs in both the first image based on the first image information obtained from the first image capturing unit 1a and the second image based on the second image information obtained from the second image capturing unit 1b. The feature point detecting unit 51 determines positions of the feature point (feature point positions) in both images. One exemplary method of detecting a feature point is to extract local feature quantities by relating vectors between pixels in the first and second images and calculate the feature point by evaluating the similarity between the local feature quantities. Alternatively, a block matching method may be used to detect feature points. The block matching method detects a feature point by dividing an image into blocks of a certain size and matching the blocks. The block matching method can detect feature points at high speed by using a sum of absolute values of corresponding pixels (SAD: Sum of Absolute Differences) as an evaluation function to evaluate degree of agreement. The feature point may be any part of the object; the feature point detecting unit 51 has templates of objects and parts thereof (feature points) prestored in the template storage unit 51a. The feature point detecting unit 51 supplies the pixel area determining unit 52 with the image information obtained from the image capturing unit 1 and feature point position information indicating the detected feature point positions.

From among all pixels available for imaging in each image capturing unit 1, the pixel area determining unit 52 determines the size of the pixel area corresponding to the image that the image capturing unit 1 will output according to the speed of the vehicle obtained from the vehicle speed detecting unit 2. For each of the image capturing units 1a, 1b, the pixel area determining unit 52 then positions the pixel area with the determined size so that the feature point position detected by the feature point detecting unit 51 is included in the pixel area with the determined size. The pixel area determining unit 52 positions the pixel area by, for example, moving the position of the pixel area with the determined size in the right, left, upward, and downward directions so as to include the feature point in the pixel area with the determined size. The pixel area determining unit 52 preferably positions the pixel area so that the feature point is located at the center of the pixel area with the determined size or within a predetermined pixel range of the center. The pixel area in this case is obtained not by clipping unnecessary parts from the captured image but by controlling the driving of the imaging device 12 to make the image capturing unit 1 output only an image with the determined pixel area size.

The result output from the vehicle speed detecting unit 2 is used to select the size of the pixel area in the pixel area determining unit 52. For example, the pixel area is reduced when the vehicle is traveling rapidly, and enlarged when the vehicle is traveling slowly. More specifically, at the threshold speed at which the mode determining unit 4 selects the distance measurement mode, the pixel area determining unit 52 takes the size consisting of all pixels available for imaging in the image capturing unit 1 as the size of the pixel area. As the speed becomes faster than the threshold speed, the pixel area determining unit 52 gradually reduces the size of the pixel area, making it smaller than the size consisting of all the pixels. Although a wide angle lens is advantageous for use in visualizing the vehicle surroundings because of its wide visual recognition area, a wide angle lens is not required for measurement of distance to a preceding object in the distance measurement mode. The frame rate can therefore be increased by controlling the size of the pixel area so as to remove the peripheral part of the image, which is not required for distance measurement, and use only the central part of the image.

A low frame rate does not cause problems when the local vehicle is traveling slowly, such as when it is being parked, but when the local vehicle is traveling rapidly, a low frame rate risks collision with a preceding object. For example, when an ordinary driver becomes aware of a preceding object while the local vehicle is traveling at a speed of 50 km/h on an asphalt road on a fine day, and steps on the brake, during the driver's reaction time of 0.7 seconds and the time of approximately 2.7 seconds it takes to stop, the local vehicle covers a considerable distance: in fact, a distance of 24 m. The time taken to measure the distance to a preceding object therefore has to be as short as possible; the longer it takes to measure the distance, the greater becomes the risk of collision with the object.

For example, when images are read at 30 frames per second from the image capturing unit 1, if charge accumulation for a single image takes 33 ms/frame, readout takes 33 ms/frame, and image processing by the feature point detecting unit 51 takes at least 33 ms/frame, then distance calculation takes 0.1 seconds or more. When only the central part of the image is captured, if the pixel area of the central part that is captured is half the full pixel area, then images can be read at 60 frames per second. The distance calculation time is therefore reduced by half. Accordingly, use of only the central part of the image can be said to be effective in the distance measurement mode.

Incidentally, the pixel area determining unit 52 supplies the camera parameter setting unit 6 with the pixel area information indicating the determined size and position of the pixel area. The pixel area determining unit 52 supplies the incident angle determining unit 53 with the feature point position information and image information obtained from the feature point detecting unit 51.

The incident angle determining unit 53 determines the angles (angles of incidence) at which light from the feature point of the object enters the right and left optical systems 11, on the basis of the pixel coordinates at which the feature point is present in the image information supplied from the pixel area determining unit 52. Respective angles of incidence are determined for the right and left optical systems 11. For example, a numeric value storage unit 53a in the incident angle determining unit 53 stores numeric information indicating angles of incidence of light from the object that has passed through the centers of the wide angle lenses used as the optical system 11 for different distances from the centers of image planes of the imaging device 12. The incident angle determining unit 53 calculates distances between the feature point positions and the centers of the images that would be captured with all the pixels, and determines the angles of incidence corresponding to the calculated distances from the numeric information. The incident angle determining unit 53 supplies the distance calculating unit 54 with incident angle information indicating the determined angles of incidence and with the image information supplied from the pixel area determining unit 52.

The distance calculating unit 54 calculates the distance to the object on the basis of the angles of incidence determined by the incident angle determining unit 53. The distance calculating unit 54 supplies the information conveying unit 9 with the distance information indicating the calculated distance.

The camera parameter setting unit 6 generates sensor driving pulse control signals that change the driving pattern of the imaging device 12 in the image capturing unit 1 responsive to the size and position of the pixel area determined by the pixel area determining unit 52. The size and position of the pixel area determined by the pixel area determining unit 52 are received as, for example, serial data set through serial communication, and the camera parameter setting unit 6 has functions for analyzing the serial data. The camera parameter setting unit 6 supplies the generated sensor driving pulse control signals to the image capturing unit 1 through the data bus 8.

The visual recognition image generating unit 7 generates a visual recognition image by which the driver can see conditions near the local vehicle. The visual recognition image generating unit 7 includes a distortion correcting unit 71 and an image combining unit 72.

The distortion correcting unit 71 corrects distortion in the first image information and second image information supplied from the mode determining unit 4. The distortion correcting unit 71 supplies the corrected first image information and corrected second image information to the image combining unit 72.

The image combining unit 72 combines the images indicated by the corrected first image information and corrected second image information supplied from the distortion correcting unit 71 to generate visual recognition image information indicating a single visual recognition image. The image combining unit 72 generates the visual recognition image information by, for example, combining the right half of the first image indicated by the first image information and the left half of the second image indicated by the second image information. The image combining unit 72 supplies the generated visual recognition image information to the information conveying unit 9.

The information conveying unit 9 outputs the distance indicated by the distance information supplied from the distance measuring unit 5 and the visual recognition image indicated by the visual recognition image information supplied from the visual recognition image generating unit 7 to enable the driver recognize them. For example, the information conveying unit 9 includes some type of display unit (not shown) that displays the distance indicated by the distance information or the visual recognition image indicated by the visual recognition image information.

Figure 3:
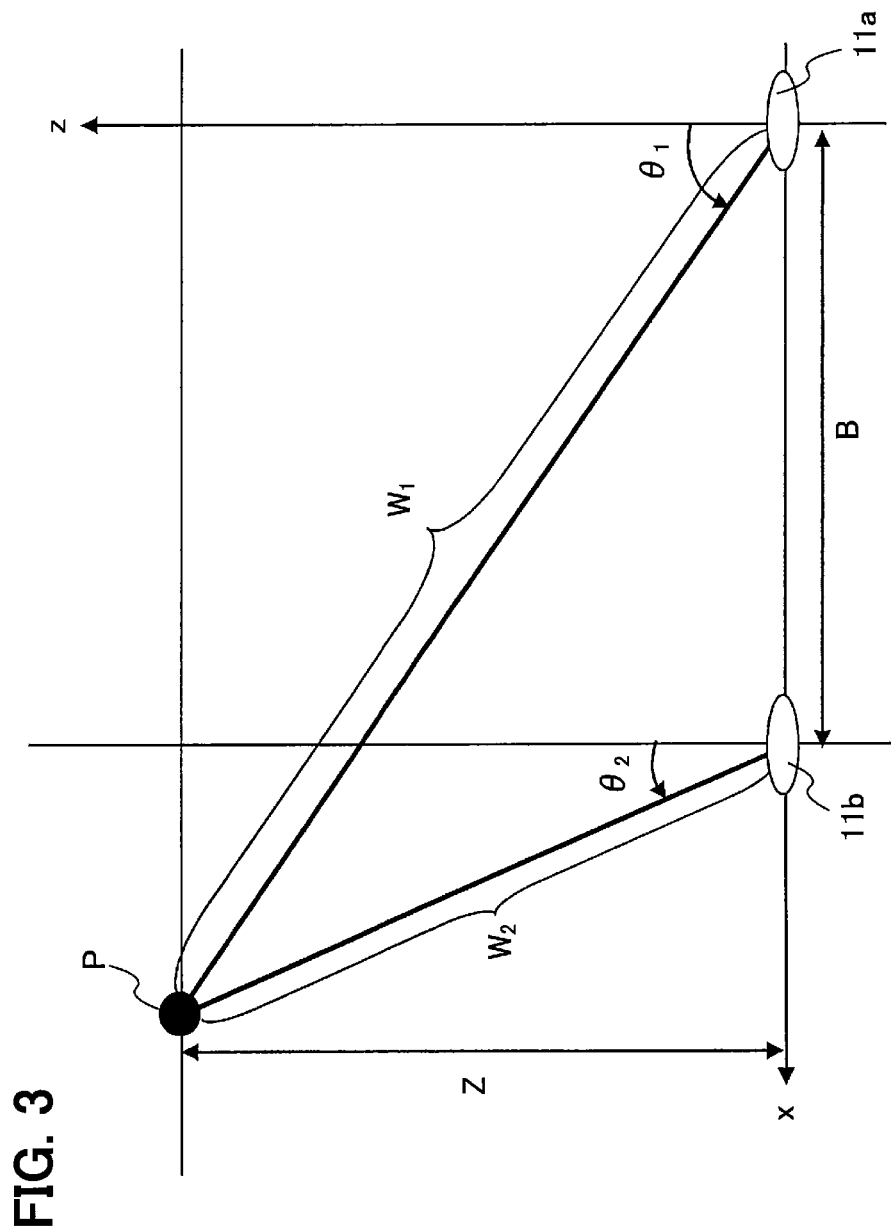
FIG. 3 is a diagram showing the two-dimensional positional relationship of the stereo camera and an object.

FIG. 3 is a diagram showing the two-dimensional positional relationship of the stereo camera and an object. In FIG. 3, point P denotes the feature point position in the object, 11a denotes the optical system of the first image capturing unit 1a, and 11b denotes the optical system of the second image capturing unit 1b. In FIG. 3, $\theta_1$ denotes the angle of incidence at which light from point P enters optical system 11a, $\theta_2$ denotes the angle of incidence at which light from point P enters optical system 11b, B denotes the distance (stereo base length) between the optical systems 11a and 11b, x denotes an x-axis, and z denotes a z-axis. Z denotes the object distance measured by perpendicular descent from point P to the x-axis, $W_1$ denotes the distance (true distance) between point P and optical system 11a, and $W_2$ denotes the distance (true distance) between point P and optical system 11b. Although the optical systems 11a and 11b have identical configurations, in distance measurement, one of the optical systems must be selected as a reference. In this embodiment, optical system 11a is taken as the reference system and $W_1$ is taken to be the distance to the preceding object in the distance measurement mode.

Figure 4:
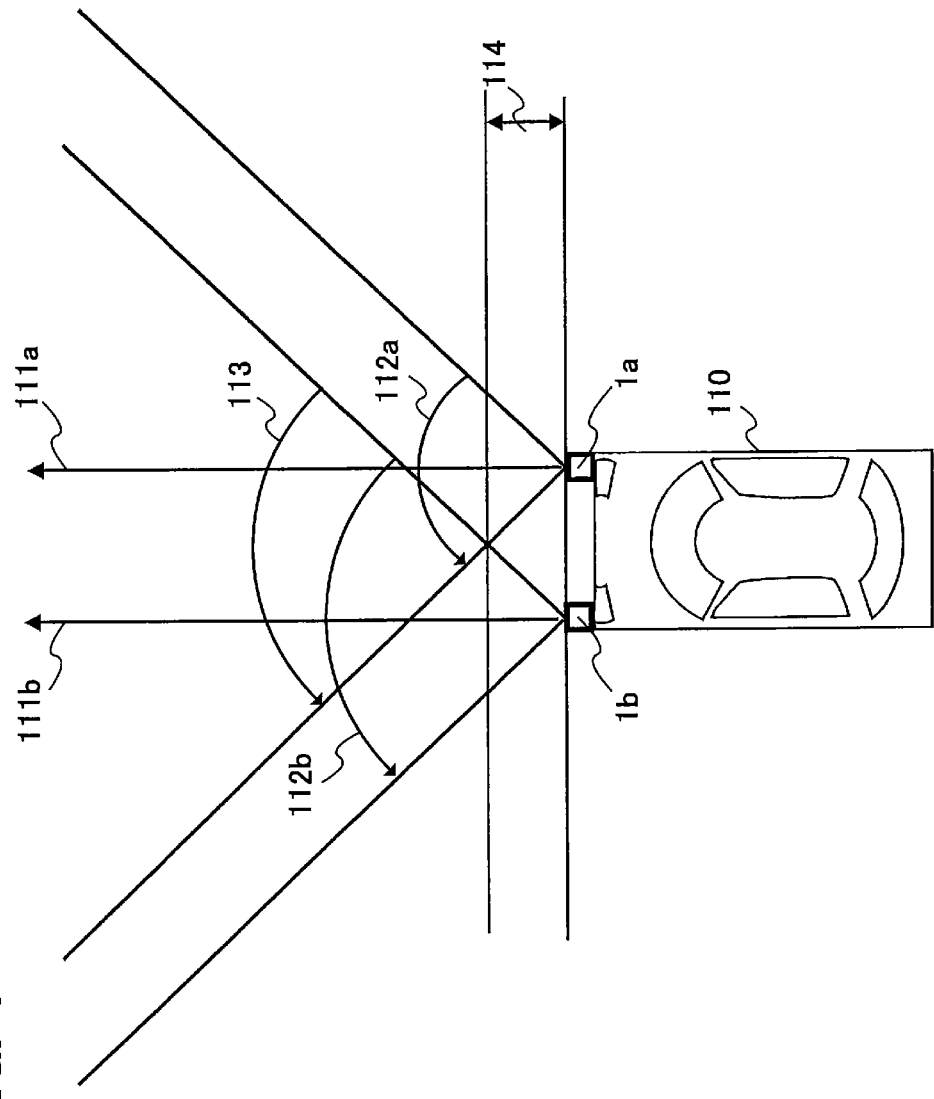
FIG. 4 is a diagram showing the area in which measurement of distance to an object is possible in the distance measurement mode.

FIG. 4 is a diagram showing the area in which measurement of distance to an object is possible in the distance measurement mode. The first image capturing unit 1a and second image capturing unit 1b include wide angle lenses with the same field angle, and are installed at the front of a vehicle 110. Reference characters 111a and 111b denote optical axes that pass through the centers of the lenses in the first image capturing unit 1a and second image capturing unit 1b, respectively. The two axes 111a, 111b are mutually parallel. Reference characters 112a and 112b denote the field angles of the lenses used in the first image capturing unit 1a and second image capturing unit 1b, respectively. The field angle 113 formed by overlap of field angles 112a and 112b encloses the area in which an object is seen in images captured by both the first image capturing unit 1a and second image capturing unit 1b, in other words, the area in which measurement of distance to the object is possible. Reference characters 114 denote the minimum distance at which measurement of distance to the object is possible. The minimum distance 114 lengthens in proportion to the stereo base length. The minimum distance 114 also lengthens as the field angles of the first image capturing unit 1a and second image capturing unit 1b become narrower.

Figure 5:
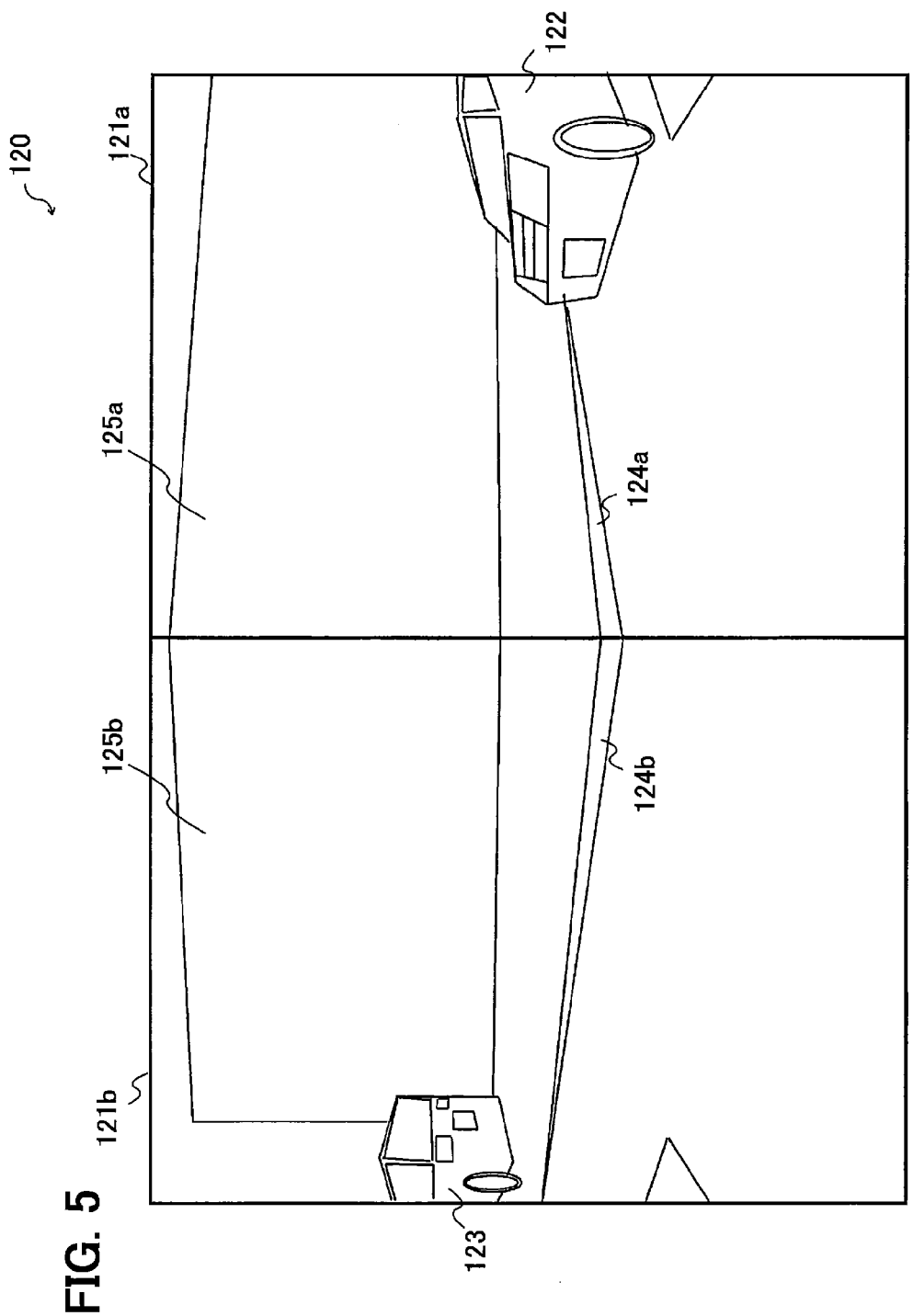
FIG. 5 is a schematic diagram showing an exemplary visual recognition image furnished to the information conveying unit in the visual recognition mode.

FIG. 5 is a schematic diagram showing an exemplary visual recognition image 120 furnished to the information conveying unit 9 in the visual recognition mode. In FIG. 5 the local vehicle is about to turn into a road from an intersecting side road; the visual recognition image 120 shows vehicle surroundings that would be blind spots for the driver in this situation.

The right half 121a of the visual recognition image 120 is the right half part of the full pixel image captured by the first image capturing unit 1a. The left half 121b of the visual recognition image 120 is the left half part of the full pixel image captured by the second image capturing unit 1b. Parts 121a and 121b are identical in size. Reference characters 122 and 123 denote vehicles approaching from the right and left, respectively, travelling in opposite lanes. Reference characters 124a and 124b denote the white center line on the road, and reference characters 125a and 125b denote wall surfaces. Distortion in both parts 121a and 121b of the image has been corrected by the distortion correcting unit 71. When operating in the visual recognition mode as described above, using the full pixel images captured by the first image capturing unit 1a and the second image capturing unit 1b through their wide angle lenses, the visual recognition image generating unit 7 can forestall collisions and other accidents by enabling the driver to see areas in the images that would otherwise be blind spots.

Figure 6:
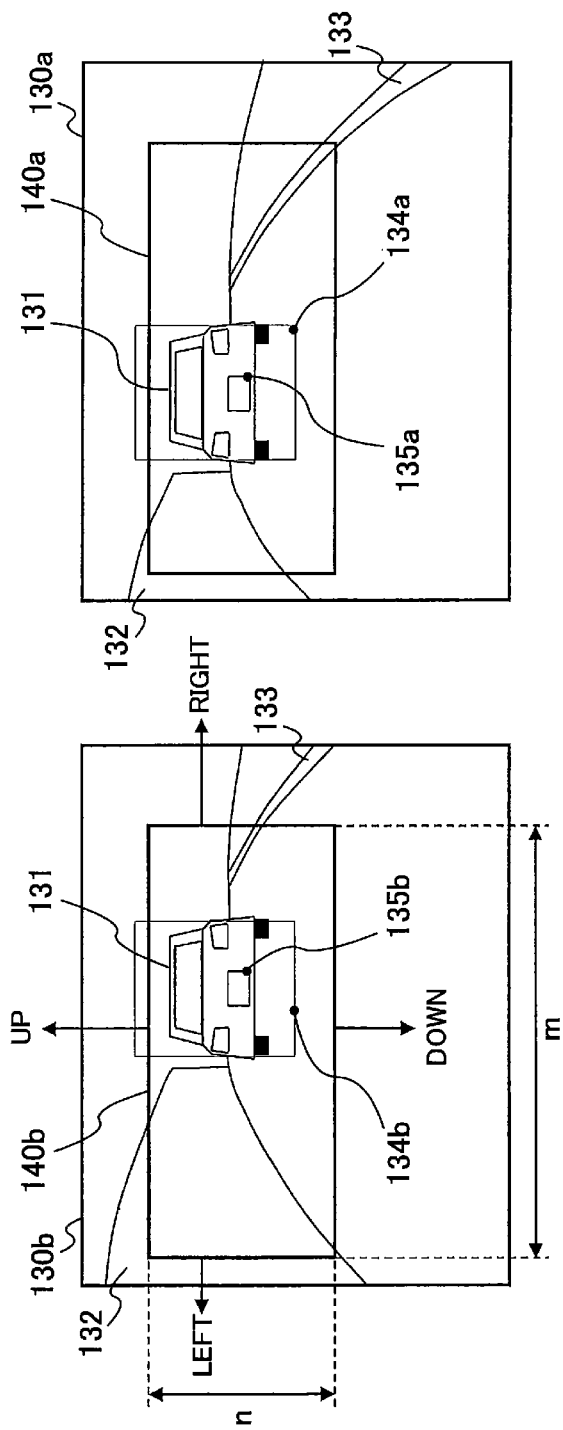
FIGS. 6(A) and 6(B) are schematic diagrams showing captured images captured by the first and second image capturing units.

FIGS. 6(A) and 6(B) are schematic diagrams showing images 130a and 130b captured by the first and second image capturing units 1a, 1b in the distance measurement mode. The captured image 130a shown in FIG. 6(A) is the full pixel image captured by the first image capturing unit 1a; captured image 130b is the full pixel image captured by the second image capturing unit 1b. Distortion corrections are not executed on captured images 130a and 130b. After processing has been executed in the feature point detecting unit 51 and the pixel area determining unit 52 and the camera parameter setting unit 6 has changed the size of the images captured by the first and second image capturing units 1a, 1b, however, the image size changes, for example, from captured images 130a and 130b to captured images 140a and 140b. Reference characters 131 denote a moving vehicle preceding the local vehicle, reference characters 132 denote a wall surface, reference characters 133 denote the white line, reference characters 134a and 134b denote the center (pixel) of captured images 130a and 130b, respectively, and reference characters 135a and 135b denote the feature point detected by the feature point detecting unit 51 in captured images 130a and 130b, respectively. The feature point detected by the feature point detecting unit 51 may be any part of the object (vehicle); the exemplary feature point shown in FIGS. 6(A) and 6(B) is the lower right corner of the preceding vehicle's rear license plate, but this is not a limitation.

In the description below, m will denote a number of pixels in the horizontal direction, and n will denote a number of pixels in the vertical direction. M will denote the number of pixels in the horizontal direction in the full pixel image captured with all the pixels available in the image capturing unit 1; N will denote the number of pixels in the vertical direction in the full pixel image.

Captured images 140a and 140b are obtained by controlling the readout control pulses of the imaging device 12 on the basis of the pixel area determined by the pixel area determining unit 52; reference characters 140a and 140b denote the images captured by the first image capturing unit 1a and the second image capturing unit 1b, respectively. Captured images 140a and 140b are identical in size.

Captured image 140b has an m×n size. The size can be changed in the vertical and horizontal directions. The pixel area determining unit 52 can change the values of m and n, for example, in proportion to the vehicle speed detected by the vehicle speed detecting unit 2.

When the vehicle speed detecting unit 2 detects that the local vehicle is traveling at a fast speed, the pixel area determining unit 52 can increase the frame rate at which images are read from the image capturing unit 1 by reducing the image size m×n. This enables the distance measuring unit 5 to reduce the time for calculating the distance to a preceding object, increasing the possibility that the user can avoid a collision with the preceding object. When the vehicle speed detecting unit 2 detects that the local vehicle is traveling at a slow speed, the pixel area determining unit 52 enlarges the image size m×n. This enables the distance measuring unit 5 to recognize objects present in a wider area.

In regard to the captured image size for a given local vehicle speed, if the full pixel image with size M×N has area S, the pixel area determining unit 52 controls the values of m and n so that, for example, the area of the captured image is S when the speed is equal to or greater than 10 km/h and less than 20 km/h, S/2 when the speed is equal to or greater than 20 km/h and less than 40 km/h, S/3 when the speed is equal to or greater than 40 km/h and less than 60 km/h, S/4 when the speed is equal to or greater than 60 km/h and less than 80 km/h, and S/5 when the speed is equal to or greater than 80 km/h. The pixel area determining unit 52 preferably makes the m×n captured image similar to the M×N full pixel image.

Although the combinations of values of m and n are not fixed, as the value of m approaches the value M of the full pixel image, the distance measuring unit 5 can recognize objects present in a wider area in the horizontal direction. This capability is effective when the road has a plurality of lanes and the distance measuring unit 5 recognizes objects present in each lane, and when the distance measuring unit 5 recognizes objects present on the shoulders of the road. The initial setting is therefore m=M.

Even when the local vehicle is traveling at a slow speed, if the distance to the preceding object is reduced, that alone increases the risk of collision. The pixel area determining unit 52 can therefore also change the image size m×n according to the vertical position of a preceding object seen in the full pixel images 130a and 130b. For example, as the position of an imaged object approaches the bottoms of captured images 130a and 130b (in the direction of the 'down' arrow in captured image 130b), the pixel area determining unit 52 assumes that the distance between the local vehicle and the object is decreasing and reduces the pixel area. As the position of the object approaches the tops of the images (in the direction of the 'up' arrow in captured image 130b), the pixel area determining unit 52 assumes that the distance between the local vehicle and the object is increasing and enlarges the pixel area. The position of an object seen in captured images 130a and 130b may be recognized from the relations between the centers 134a and 134b of captured images 130a and 130b and the feature points 135a, 135b. For example, as the feature points 135a, 135b lie further below the centers 134a, 134b of captured images 130a and 130b, the pixel area determining unit 52 decides that the position of the imaged object is approaching the bottoms of captured images 130a and 130b. As the feature points 135a, 135b lie further above the centers 134a, 134b of captured images 130a and 130b, the pixel area determining unit 52 decides that the position of the imaged object is approaching the tops of captured images 130a and 130b. Because, as described above, the distance measuring unit 5 can reduce the time for calculating the distance to the preceding object as the distance to a preceding object decreases, the user's chances of avoiding a collision with the preceding object increase.

Control by vertical position as described above may be performed in place of control by local vehicle speed, or may be performed together with control by local vehicle speed. For example, the pixel area determining unit 52 may first specify a size for the pixel area according to the local vehicle speed, and then modify the specified size on the basis of the vertical position of the feature point to determine the size of the pixel area.

The distance information pertaining to the distance to the preceding object calculated by the distance calculating unit 54 may be fed back to the pixel area determining unit 52, and the pixel area determining unit 52 may change the m×n image size on the basis of the actually measured value of the distance. For example, as the distance to the preceding object becomes increasingly shorter than a predetermined distance, the pixel area determining unit 52 can make the m×n image size increasingly smaller than the image size for the predetermined distance. Because the distance measuring unit 5 can then reduce the time for calculating the distance to the preceding object as the distance to the preceding object becomes increasingly shorter than the predetermined distance, the user's chances of avoiding a collision with the preceding object improve.

The positions of the centers 134a, 134b of the captured images and the feature points 135a, 135b are preferably represented by coordinates in the full pixel captured images 130a, 130b. For example, if among the four corners of captured image 130a (captured image 130b) the lower left corner and upper right corner have coordinates (0, 0) and (M, N), the centers 134a, 134b can be represented by coordinates (M/2, N/2). The feature points 135a, 135b can be represented by coordinates $(\alpha,\beta)$ $(0 \leq \alpha \leq M, 0 \leq \beta \leq N)$. When captured images 140a, 140b are generated, the centers 134a, 134b and the feature points 135a, 135b are represented by coordinates (M/2, N/2) and $(\alpha,\beta)$.

Figure 7:
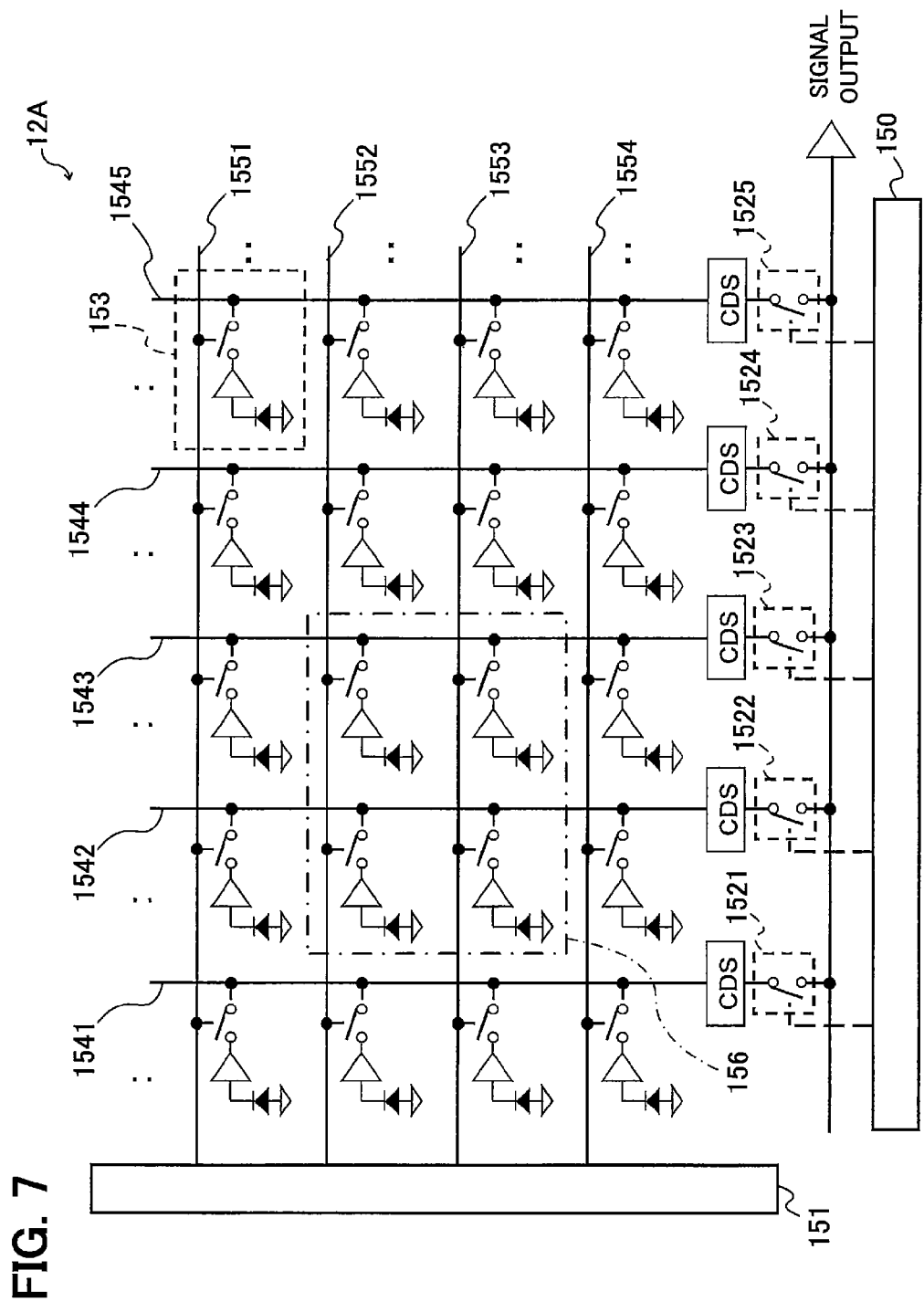
FIG. 7 is a schematic diagram showing the structure of a CMOS imaging device.

Next, control of the driving of the imaging device 12 for changing the image size of the captured image will be described with reference to FIGS. 7 and 8. FIG. 7 is a schematic diagram showing the structure of a CMOS imaging device 12A. Reference characters 150 denote a horizontal scanning circuit, reference characters 151 denote a vertical scanning circuit, and reference characters 1521 to 1525 denote column selectors. The area indicated by dashed line 153 is the area occupied by a single pixel. The area indicated by dashed line 153 includes a MOS transistor, a photodiode amplifier, and a pixel selector. Reference characters 1541 to 1545 denote vertical signal lines, and reference characters 1551 to 1554 denote horizontal signal lines. The charge accumulated for each pixel is both converted to a voltage and then amplified by the amplifier. The amplified voltages are supplied to the vertical signal lines 1541 to 1545 row by row by controlling the horizontal signal lines 1551 to 1554 to turn the pixel selectors on and off. The voltages are temporarily held in a CDS circuit disposed in each of the vertical signal lines 1541 to 1545 and then output by turning the column selectors 1521 to 1525 on and off. An image of a partial area 156 can be read as the captured image by controlling some of the horizontal signal lines 1552, 1553 and some of the column selection switches 1522, 1523 from the sensor driving circuit 14.

Figure 8:
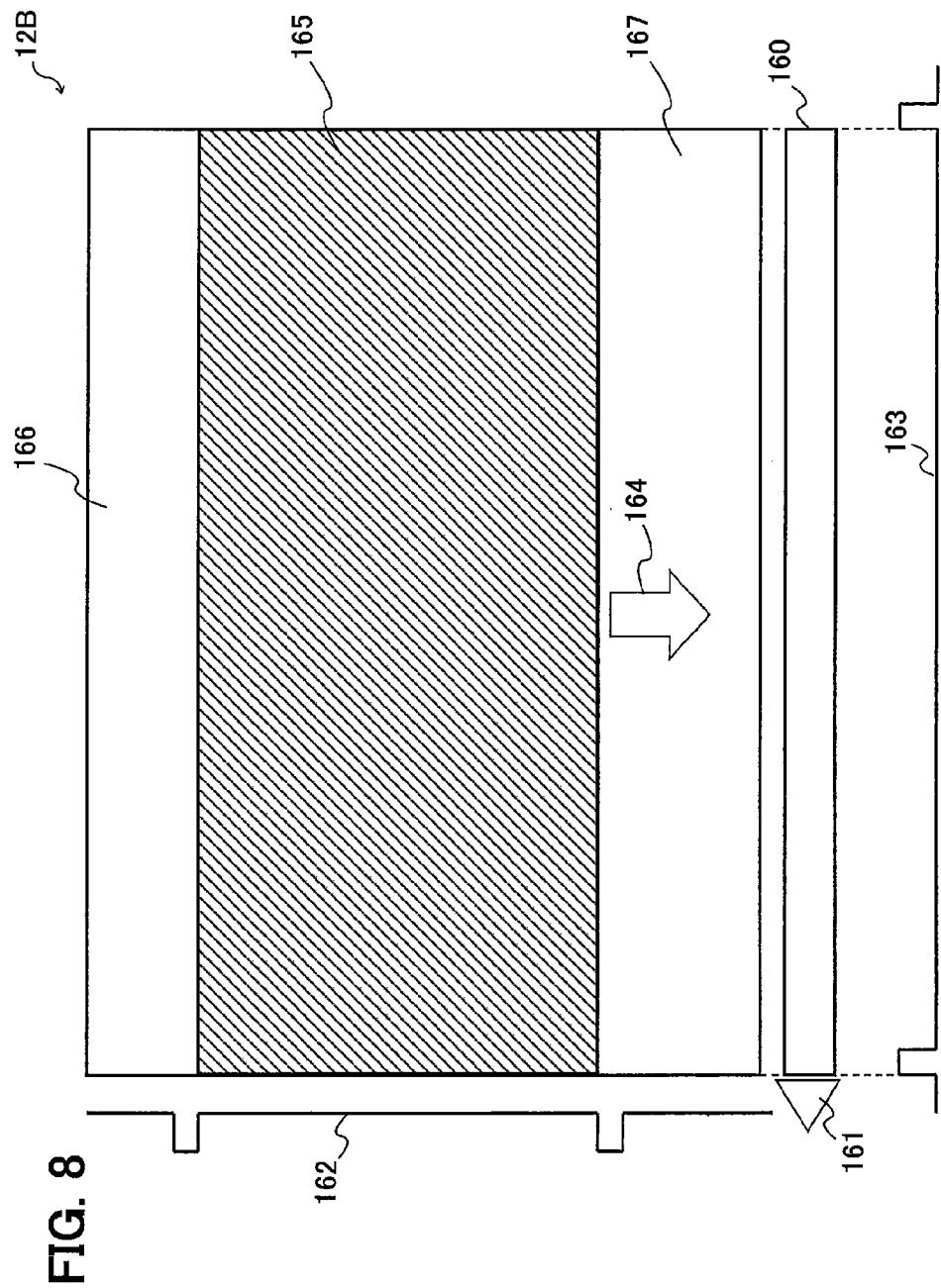
FIG. 8 is a schematic diagram showing the structure of a CCD imaging device.

FIG. 8 is a schematic diagram showing the structure of a CCD imaging device 12B. Reference characters 160 denote a horizontal transfer CCD, reference characters 161 denote an output amplifier, reference characters 162 denote a horizontal synchronization signal, and reference characters 163 denote a vertical synchronization signal. Reference characters 164 denote the direction in which charge is transferred within vertical transfer CCDs (not shown). In FIG. 8, the hatched area 165 is the pixel area; areas 166 and 167 are undesired pixel areas. In a CCD imaging device 12B, desired pixels cannot be specified and read as they can in a CMOS imaging device. Therefore, all the pixel charges are read out through the vertical transfer CCDs (not shown), but the frame rate can be increased by reading the desired pixels in the pixel area 165 at a normal vertical charge transfer rate, and reading the undesired pixels in areas 166 and 167 at a faster charge transfer rate than the normal vertical charge transfer rate and discarding them. The sensor driving circuit 14 controls the vertical charge transfer rate.

Figure 9:
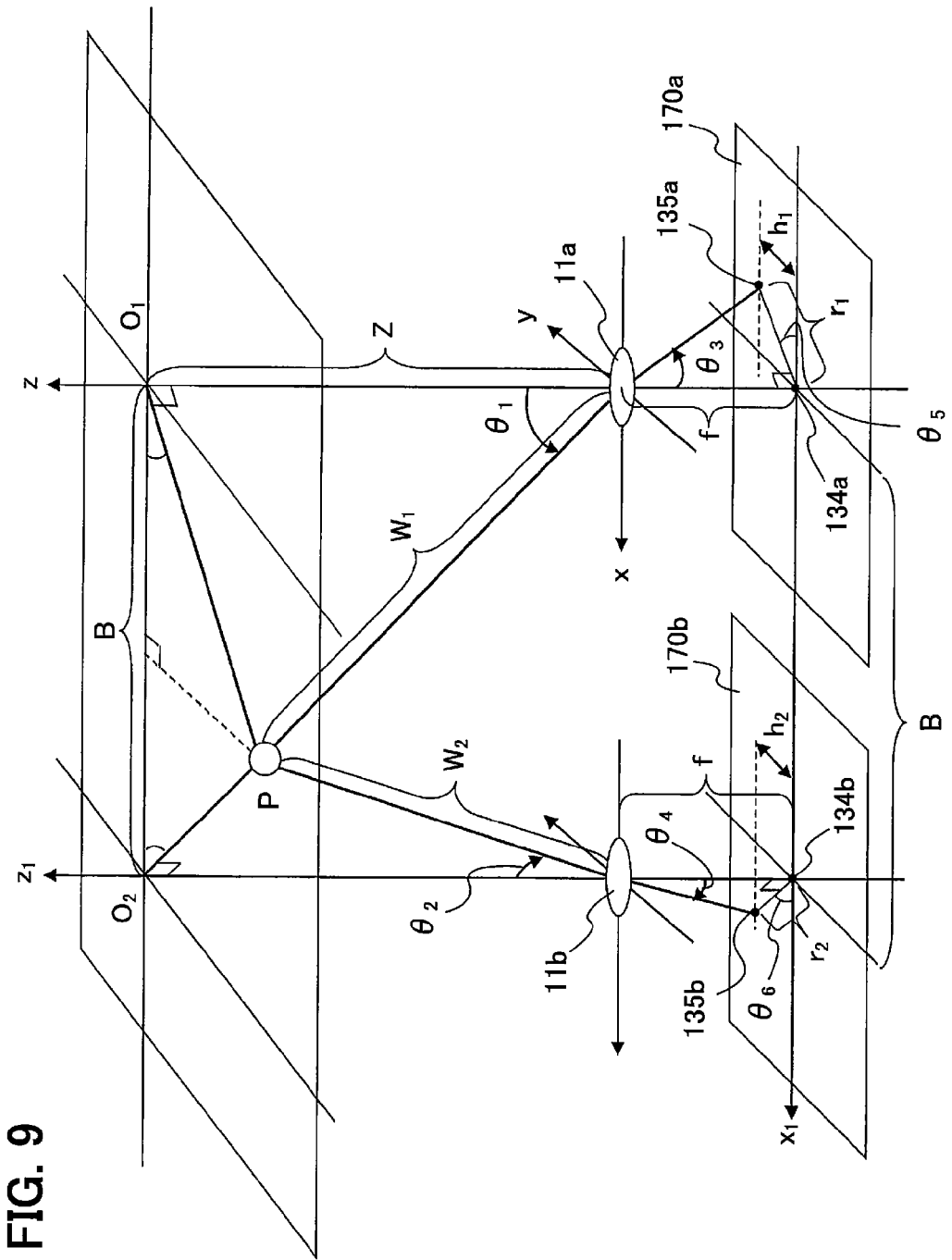
FIG. 9 is a diagram showing the three-dimensional positional relationship of the stereo camera and an object.

FIG. 9 is a diagram showing the three-dimensional positional relationship of the stereo camera and an object. In FIG. 9, x denotes the x-axis, y denotes the y-axis, and z denotes the z-axis. Point P denotes the feature point position in the object, 11*a* denotes the optical system of the first image capturing unit 1*a*, and 11*b* denotes the optical system of the second image capturing unit 1*b*. $\theta_1$ denotes the angle of incidence at which light from point P enters optical system 11*a*, $\theta_3$ denotes the angle formed by the z-axis and the light path in which deviation has occurred because of distortion aberration when the light passes through optical system 11*a*, $\theta_2$ denotes the angle of incidence at which light from point P enters optical system 11*b*, and $\theta_4$ denotes the angle formed by an axis parallel to the z-axis and the light path in which deviation has occurred because of distortion aberration when the light passes through optical system 11*b*. Reference characters 170*a*, 170*b* denote the surfaces of the imaging devices in the first image capturing unit 1*a* and the second image capturing unit 1*b*, and B denotes the distance between the optical systems 11*a* and 11*b* (the stereo base length). $O_1$ denotes the point of intersection of the z-axis and a plane parallel to the image planes 170*a*, 170*b* and including point P, and $O_2$ denotes the point of intersection of a $z_1$-axis parallel to the z-axis and the plane parallel to the image planes 170*a*, 170*b* and including point P. Z denotes the object distance measured by perpendicular descent from point $O_1$ to the x and y axes, $W_1$ denotes the distance (true distance) between point P and optical system 11*a*, and $W_2$ denotes the distance (true distance) between point P and optical system 11*b*. Reference characters 134*a* and 134*b* denote the centers of the image planes 170*a* and 170*b*, respectively, f denotes focal length, and reference characters 135*a* and 135*b* denote the feature point on the image planes 170*a* and 170*b*, respectively. $r_1$ denotes the distance from feature point 135*a* to image center point 134*a*, $r_2$ denotes the distance from feature point 135*b* to image center point 134*b*, $h_1$ denotes the length of a segment descending perpendicularly from the feature point 135*a* to an $x_1$-axis parallel to the x-axis on the image planes 170*a*, 170*b*, and $h_2$ denotes the length of a segment descending perpendicularly from the feature point 135*b* to the $x_1$-axis parallel to the x-axis. $\theta_5$ denotes the angle formed by segment $r_1$ and the $x_1$-axis, and $\theta_6$ denotes the angle formed by segment $r_2$ and the $x_1$-axis.

A method of calculating the distance $W_1$ to an object will be described on the basis of FIG. 9. From FIG. 9, the following equations (1) to (4) hold. The distance $W_1$ to the object, which is the distance to be calculated, is given by equation (4).

$$B = W_1 \sin\theta_1 \cos\varphi + W_2 \sin\theta_2 \cos\psi \qquad (1)$$

$$\begin{cases} \varphi = \sin^{-1} \dfrac{h_1}{r_1} \\ \psi = \sin^{-1} \dfrac{h_2}{r_2} \end{cases} \qquad (2)$$

$$Z = W_1 \cos\theta_1 = W_2 \cos\theta_2 \qquad (3)$$

$$W_1 = \dfrac{1}{\cos\theta_1} \times \dfrac{B}{\tan\theta_1 \cos\varphi + \tan\theta_2 \cos\psi} \qquad (4)$$

Values $r_1$, $r_2$, $h_1$, and $h_2$ in equations (1) to (4) are determined after the processing by the feature point detecting unit 51 is executed, and are measured in pixels. $\theta_1$ and $\theta_2$ can be determined by referring to the numeric information referred to by the incident angle determining unit 53. This numeric information is, for example, a reference table from which the angles of incidence can be read according to the distance between the feature point and the center of the image, with the distortion aberration characteristic of the optical system 11 taken into consideration in the example in FIG. 9. The reason why the input value for obtaining the output value (angle of incidence) is $r_1$ or $r_2$, which is the distance between the feature point and the center of the image, is based on the assumption that all points on concentric circles referenced to the center of the image have identical distortion factors. Once the angles at which light rays from the object enter the optical systems 11*a*, 11*b* have been found, the distance to the object can be calculated from equations (1) to (4).

Next, the operation of the image processing apparatus 100 according to the embodiment of the invention will be described with reference to FIGS. 10 to 12.

Figure 10:
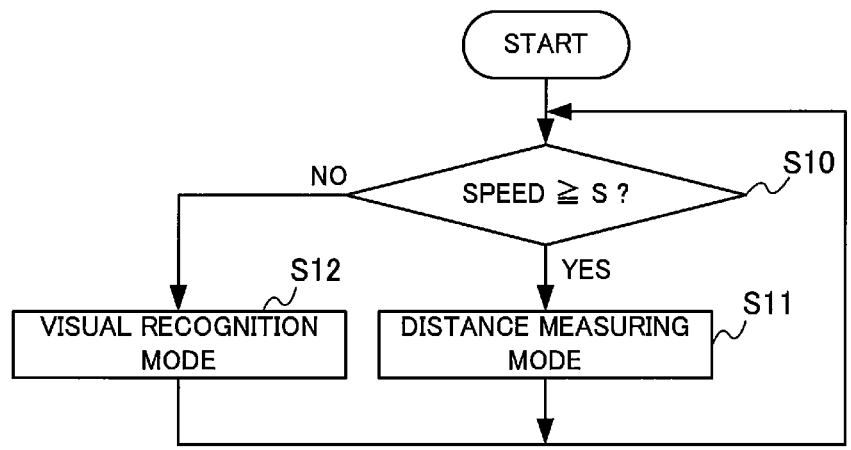
FIG. 10 is a flowchart illustrating processing performed by the mode determining unit.

FIG. 10 is a flowchart illustrating processing performed by the mode determining unit 4.

When the information indicating the local vehicle speed is received from the vehicle speed detecting unit 2, the mode determining unit 4 decides whether or not the local vehicle speed is equal to or greater than a predetermined threshold speed S (km/h) (S10). If the local vehicle speed is equal to or greater than the predetermined threshold speed S (km/h) (step S10: Yes), the mode determining unit 4 proceeds to the processing in step S11; if the local vehicle speed is less than the predetermined threshold speed S (km/h) (step S10: No), the mode determining unit 4 proceeds to the processing in step S12.

In step S11, operating in the distance measurement mode, the mode determining unit 4 supplies the distance measuring unit 5 with the image information obtained from the image capturing unit 1.

In step S12, operating in the visual recognition mode, the mode determining unit 4 supplies the visual recognition image generating unit 7 with the image information obtained from the image capturing unit 1.

Figure 11:
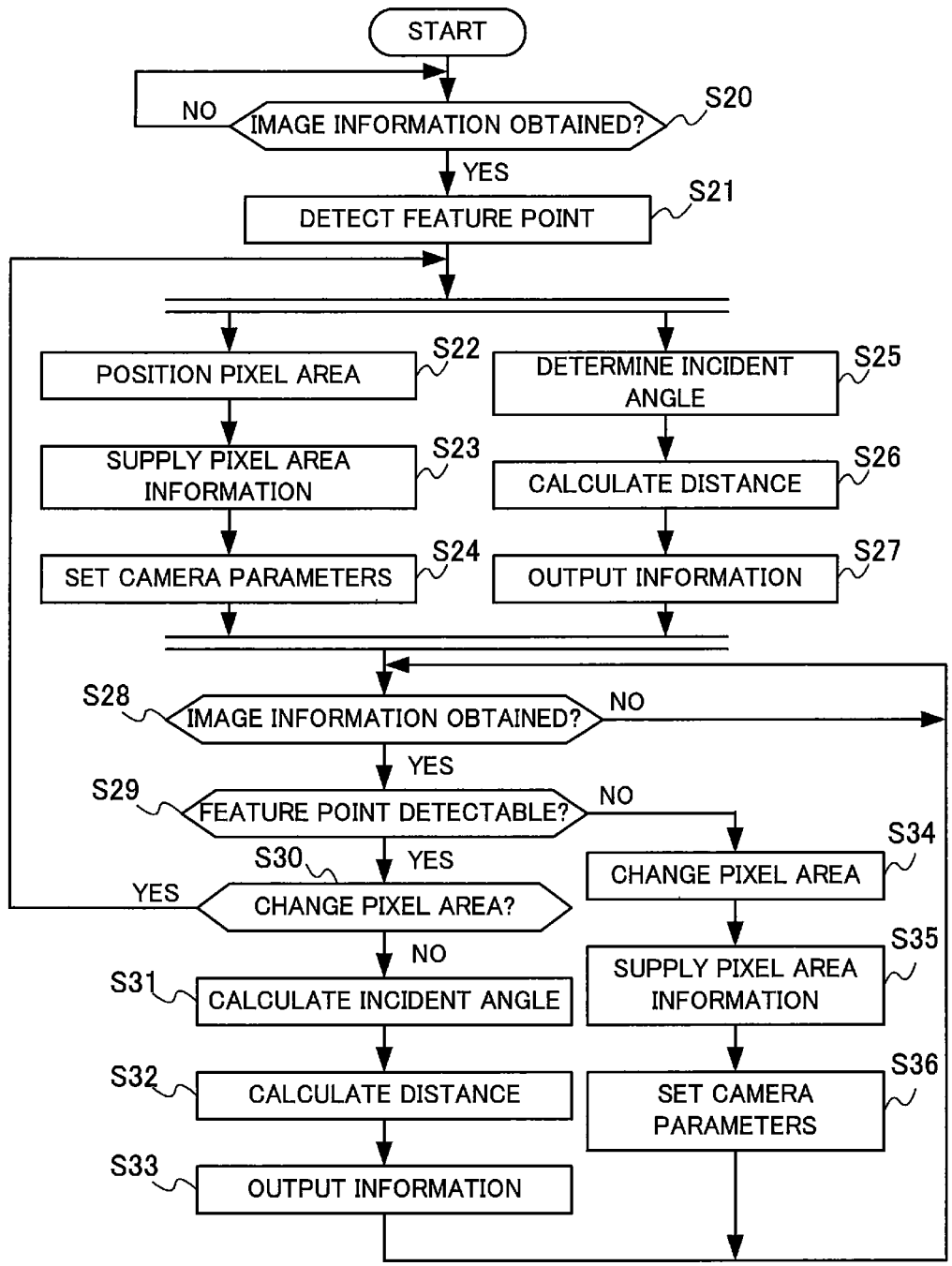
FIG. 11 is a flowchart illustrating processing performed in the distance measurement mode.

FIG. 11 is a flowchart illustrating the processing performed in the distance measurement mode.

First, the feature point detecting unit 51 decides whether or not image information has been obtained from the mode determining unit 4 (S20). If the image information has been obtained (step S20: Yes), the processing proceeds to step S21.

In step S21, the feature point detecting unit 51 detects a predetermined feature point of a predetermined object on the basis of the image information obtained from the mode determining unit 4. The feature point is detected in both of the first image information supplied from the first image capturing unit 1*a* and the second image information supplied from the second image capturing unit 1*b*.

Next, the pixel area determining unit 52 determines the size of a pixel area corresponding to the local vehicle speed obtained from the vehicle speed detecting unit 2, and positions the pixel area so that the feature point detected by the feature point detecting unit 51 is included in an image with that pixel area size (S22). The pixel area is positioned in both of the first image information supplied from the first image capturing unit 1*a* and the second image information supplied from the second image capturing unit 1*b*.

The pixel area determining unit 52 supplies the camera parameter setting unit 6 with the pixel area information indicating the pixel area determined in step S22.

The camera parameter setting unit 6 generates driving pulse control signals that change the driving pattern of the imaging device 12 in each image capturing unit 1 responsive to the pixel area determined by the pixel area determining unit 52, and supplies the generated driving pulse control signals to the image capturing unit 1 through the data bus 8 (S24).

In parallel with the processing in steps S22 to S24, the incident angle determining unit 53 obtains the image information output from the mode determining unit 4 through the pixel area determining unit 52 and the feature point position information indicating the position of the feature point detected by the feature point detecting unit 51, and determines the angles of incidence at which light enters the lenses in the first image capturing unit 1a and second image capturing unit 1b on the basis of the information described above (S25).

Next, the distance calculating unit 54 calculates the distance to the object on the basis of the angles of incidence determined by the incident angle determining unit 53 and the feature point position detected by the feature point detecting unit 51 (S26).

The distance calculating unit 54 supplies the information conveying unit 9 with the distance information indicating the distance calculated in step S26 (S27). A display unit or the like, for example, in the information conveying unit 9 that obtains the distance information described above displays the distance indicated by the obtained distance information.

Next, the feature point detecting unit 51 decides whether or not image information has been obtained from the mode determining unit 4 (S28). If image information has been obtained (step S28: Yes), the processing proceeds to step S29.

In step S29, the feature point detecting unit 51 decides whether or not the predetermined feature point of the predetermined object can be detected on the basis of the image information obtained from the mode determining unit 4. If the feature point can be detected (step S29: Yes), the feature point detecting unit 51 detects the feature point, and proceeds to the processing in step S29; if the feature point cannot be detected (step S29: No), the processing proceeds to step S34.

In step S30, the pixel area determining unit 52 decides whether or not there is a need to change the size and position of the pixel area. For example, if the local vehicle speed obtained from the vehicle speed detecting unit 2 has changed by a predetermined amount, the pixel area determining unit 52 decides that there is need to change the size of the pixel area; if the feature point position has moved away from the center of the pixel area by a predetermined amount, the pixel area determining unit 52 decides that there is need to change the position of the pixel area. When the pixel area determining unit 52 decides that there is a need to change at least one of the size and position of the pixel area (step S30: Yes), the processing returns to steps S22 and S25; when the pixel area determining unit 52 decides that there is no need to change the size and position of the pixel area (step S30: No), the processing proceeds to step S31.

In step S31, the incident angle determining unit 53 obtains the image information output from the mode determining unit 4 through the pixel area determining unit 52 and the feature point position information indicating the position of the feature point detected by the feature point detecting unit 51, and determines the angles of incidence at which light is incident on the lenses in the first image capturing unit 1a and second image capturing unit 1b on the basis of the information described above.

Next, the distance calculating unit 54 calculates the distance to the object on the basis of the angles of incidence determined by the incident angle determining unit 53 and the feature point position detected by the feature point detecting unit 51 (S32).

The distance calculating unit 54 supplies the information conveying unit 9 with the distance information indicating the distance calculated in step S32 (S33).

In step S34, because the feature point is not included in the captured image, the pixel area determining unit 52 assumes that the feature point has moved out-of-frame from the pixel area, and moves the position of the pixel area in the direction in which the feature point has moved out-of-frame. For example, the pixel area determining unit 52 stores feature point position information in time series order in the feature point position storage unit 52a, and determines the direction in which the feature point has moved out-of-frame by the path of the feature point positions indicated by the feature point position information. For example, the pixel area determining unit 52 may decide the direction in which the feature point has moved out-of-frame by the direction in which the path of feature point positions has moved away from the center of the captured image, or may decide by a vector in which the feature point position at a time $t_1$ is taken as a starting point, and the feature point position at a time $t_2$ after a predetermined time has elapsed since time $t_1$ is taken as an endpoint.

The pixel area determining unit 52 supplies the camera parameter setting unit 6 with pixel area information indicating the size and position of the pixel area as altered in step S34 (S35).

The camera parameter setting unit 6 generates sensor driving pulse control signals that change the driving pattern of the imaging device 12 in each image capturing unit 1 responsive to the pixel area indicated by the pixel area information supplied in step S35, and supplies the generated sensor driving pulse control signals to the image capturing unit 1 through the data bus 8 (S36).

Figure 12:
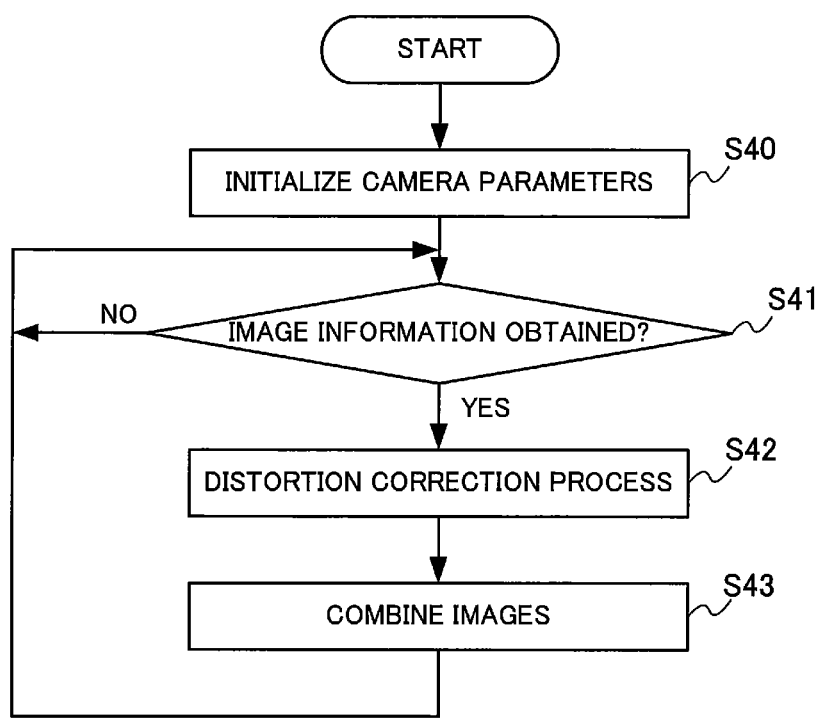
FIG. 12 is a flowchart illustrating processing performed in the visual recognition mode.

FIG. 12 is a flowchart illustrating the processing performed in the visual recognition mode.

When a switchover to the visual recognition mode is decided upon, the mode determining unit 4 instructs the camera parameter setting unit 6 to initialize the pixel area (S40). On receiving this instruction, the camera parameter setting unit 6 generates sensor driving pulse control signals that change the driving pattern of the imaging device 12 in each image capturing unit 1 so that the pixel area is the full pixel area (maximum image size), and supplies the generated sensor driving pulse control signals to the image capturing unit 1 through the data bus 8.

Next, the distortion correcting unit 71 checks whether or not image information has been obtained from the mode determining unit 4 (S41). If image information has been obtained (step S41: Yes), the distortion correcting unit 71 proceeds to the processing in step S42.

In step S42, the distortion correcting unit 71 corrects distortion in the image information obtained from the mode determining unit 4. Distortion in both the first image obtained from the first image capturing unit 1a and the second image obtained from the second image capturing unit 1b is corrected.

The image combining unit 72 generates the combined image by combining at least part of the first image and at least part of the second image as corrected by the distortion correcting unit 71 (S43). The image combining unit 72 supplies the information conveying unit 9 with the combined image information indicating the combined image. When it obtains the combined image information, the information conveying unit 9 causes a display unit or the like to display the combined image indicated by the combined image information.

As described above, in this embodiment, because the operating mode can be switched according to the vehicle speed between a visual recognition mode that displays images of the surroundings of the local vehicle and a distance measurement mode that outputs the distance to a preceding vehicle, appropriate information can be communicated to the driver of the vehicle according to the vehicle speed. Because processing is appropriately performed in the visual recognition mode and the distance measurement mode on the basis of the image information from the image capturing unit 1, which are wide angle cameras, there is no need to install cameras with field angles suitable to the respective modes. Moreover, since the size of the images captured by the image capturing unit 1 is changed according to the vehicle speed in the distance measurement mode, the distance measuring unit 5 can obtain image information from the image capturing unit 1 at a frame rate responsive to the vehicle speed.

In the embodiment described above, the image capturing unit 1 is installed at the front of the local vehicle, but installation at the front of the vehicle is not a limitation; the image capturing unit 1 may be installed at the rear or on the sides of the local vehicle.

Because the charge exposure time of the imaging device 12 can be adjusted by driving pulse control of the imaging device 12, the camera parameter setting unit 6 can control the charge exposure time as well as the pixel area of the image.

Although it is the position of the pixel area that is changed in step S34 in FIG. 11 in the embodiment described above, the pixel area may be enlarged, for example, to include the feature point.

Although the distance calculating unit 54 supplies the information conveying unit 9 with the distance information indicating the calculated distance in the embodiment described above, a mark that changes in color or shape according to the calculated distance, for example, or a warning tone that changes according to the calculated distance may be supplied to the information conveying unit 9. If the information transmitted to the information conveying unit 9 is a distance or a mark, the information conveying unit 9 operates as a display in the interior of the vehicle and the information is displayed on a screen. If the information transmitted to the information conveying unit 9 is a sound, the information conveying unit 9 operates as a speaker, and makes the driver aware of the distance to the preceding object by sound.

REFERENCE CHARACTERS

100: image processing apparatus, 1*a*: first image capturing unit, 1*b*: second image capturing unit, 11: optical system, 12: imaging device, 13: AD converter, 14: sensor driving circuit, 2: vehicle speed detecting unit, 3: ECU, 4: mode determining unit, 5: distance measuring unit, 51: feature point detecting unit, 51*a*: template storage unit, 52: pixel area determining unit, 52*a*: feature point position storage unit, 53: incident angle determining unit, 53*a*: numeric value storage unit; 54: distance calculating unit, 6: camera parameter setting unit, 7: visual recognition image generating unit, 71: distortion correcting unit, 72: image combining unit, 8: data bus, 9: information conveying unit.

What is claimed is:

1. An image processing apparatus comprising:
   a plurality of image capturing units with wide angle lenses for capturing at least partly overlapping images;
   a vehicle speed detecting unit for detecting a speed of a local vehicle;
   a distance measuring unit for calculating a distance from the local vehicle to an object imaged by the plurality of image capturing units on a basis of a plurality of images captured by the plurality of image capturing units;
   a visual recognition image generating unit for generating a visual recognition image for recognition of conditions near the local vehicle from the plurality of images captured by the plurality of image capturing units; and
   a mode determining unit for causing the distance measuring unit to calculate the distance to the object when the speed detected by the vehicle speed detecting unit is equal to or greater than a predetermined threshold speed, and causing the visual recognition image generating unit to generate the visual recognition image when the speed detected by the vehicle speed detecting unit is less than the predetermined threshold speed;
   the distance measuring unit further comprising a pixel area determining unit for determining, for each of the plurality of image capturing units, sizes and positions of corresponding pixel areas in images output from each of the plurality of image capturing units, among all pixels usable for imaging in each of the plurality of image capturing units;
   the pixel area determining unit making the size of the pixel areas smaller as the speed detected by the vehicle speed detecting unit becomes faster.

2. The image processing apparatus of claim 1, wherein the visual recognition image generating unit further comprises:
   a distortion correction unit for correcting distortion in each of the plurality of images captured by the plurality of image capturing units; and
   an image combining unit for extracting at least some of the images from the plurality of images corrected by the distortion correction unit, and combining the extracted images to generate the visual recognition image.

3. An image processing method comprising:
   an image capturing step for capturing a plurality of at least partly overlapping images through wide angle lenses;
   a vehicle speed detecting step for detecting a speed of a local vehicle;
   a distance measuring step for calculating a distance from the local vehicle to an object imaged in the image capturing step on a basis of the plurality of images captured in the image capturing step;
   a visual recognition image generating step for generating a visual recognition image for recognition of conditions near the local vehicle from the plurality of images captured in the image capturing step; and
   a mode determining step for causing the distance measuring step to calculate the distance to the object when the speed detected by the vehicle speed detecting step is equal to or greater than a predetermined threshold speed, and causing the visual recognition image generating step to generate the visual recognition image when the speed detected by the vehicle speed detecting step is less than the predetermined threshold speed;
   the distance measuring step further comprising a pixel area determining step for determining sizes and positions of corresponding pixel areas in images output in the image capturing step for each of the plurality of images, among all pixels usable for imaging in the image capturing step;
   the pixel area determining step making the size of the pixel areas smaller as the speed detected in the vehicle speed detecting step becomes faster.

4. The image processing method of claim 3, wherein the visual recognition image generating step further comprises:
   a distortion correction step for correcting distortion in each of the plurality of images captured in the image capturing step; and
   an image combining step for extracting at least some of the images from the plurality of images corrected in the distortion correction step, and combining the extracted images to generate the visual recognition image.

5. An image processing apparatus comprising:
a plurality of image capturing units with wide angle lenses for capturing at least partly overlapping images;
a vehicle speed detecting unit for detecting a speed of a local vehicle;
a distance measuring unit including a pixel area determining unit for determining, for each of the plurality of image capturing units, sizes and positions of corresponding pixel areas in images output from each of the plurality of image capturing units, among all pixels usable for imaging in each of the plurality of image capturing units, a feature point detecting unit for detecting a feature point of the object in each of the images captured by the plurality of image capturing units and determining respective positions of the feature point, and a distance calculating unit for calculating a distance from the local vehicle to an object imaged by the plurality of image capturing units on a basis of a plurality of images captured by the plurality of image capturing units;
a visual recognition image generating unit for generating a visual recognition image for recognition of conditions near the local vehicle from the plurality of images captured by the plurality of image capturing units; and
a camera parameter setting unit for causing the plurality of image capturing units to output images with the pixel area size determined by the pixel area determining unit;
the pixel area determining unit increasing a frame rate at which the images are read from the plurality of image capturing units by making the size of the pixel areas smaller as the speed detected by the vehicle speed detecting unit becomes faster, determining the positions of the pixel areas so as to include the positions of the feature point determined by the feature point detecting unit, and increasing a frame rate at which the images are read from the plurality of image capturing units by making the size of the pixel areas smaller as the positions of the feature point determined by the feature point detecting unit lie further below a center of all the pixels usable for imaging in each of the plurality of image capturing units.

6. The image processing apparatus of claim 5, wherein:
the distance measuring unit further comprises a feature point position storage unit for storing feature point position information indicating the positions of the feature point determined by the feature point detecting unit; and
when the feature point detecting unit cannot detect the feature point, the pixel area determining unit determines a direction in which the feature point moved out-of-frame by referring to the feature point position information and moves the positions of the pixel areas in the determined direction.

7. The image processing apparatus of claim 5, wherein:
the distance measuring unit further comprises an incident angle determining unit for determining angles at which light from the object is incident on the wide angle lenses, responsive to the positions of the feature point determined by the feature point detecting unit; and
the distance calculating unit calculates the distance to the object on a basis of the angles of incidence determined by the incident angle determining unit.

8. The image processing apparatus of claim 7, wherein:
the image capturing units further comprise imaging devices that receive light that has passed through the wide angle lenses;
the distance measuring unit further comprises a numeric value storage unit for storing numeric information indicating angles of incidence of light from the object that has passed through centers of the wide angle lenses for respective distances from centers of image planes of the imaging devices; and
the incident angle determining unit calculates distances between the centers of the image planes of the imaging devices and the positions of the feature point detected by the feature point detecting unit, and determines the angles of incidence corresponding to the calculated distances from the numeric information.

9. An image processing method comprising:
an image capturing step for capturing a plurality of at least partly overlapping images through wide angle lenses;
a vehicle speed detecting step for detecting a speed of a local vehicle;
a distance measuring step including a pixel area determining step for determining, for each of the plurality of images, sizes and positions of corresponding pixel areas in images output from the image capturing step, among all pixels usable for imaging in the image capturing step, a feature point detecting step for detecting a feature point of the object in each of the images captured in the image capturing step and determining respective positions of the feature point, and a distance calculating step for calculating a distance from the local vehicle to an object imaged in the image capturing step on a basis of a plurality of images captured in the image capturing step;
a visual recognition image generating step for generating a visual recognition image for recognition of conditions near the local vehicle from the plurality of images captured in the image capturing step; and
a camera parameter setting step for causing the image capturing step to output images with the pixel area size determined in the pixel area determining step;
the pixel area determining step increasing a frame rate at which the images are read in the image capturing step by making the size of the pixel areas smaller as the speed detected by the vehicle speed detecting step becomes faster, determining the positions of the pixel areas so as to include the positions of the feature point determined in the feature point detecting step, and increasing a frame rate at which the images are read in the image capturing step by making the size of the pixel areas smaller as the positions of the feature point determined in the feature point detecting step lie further below a center of all the pixels usable for imaging in the image capturing step.

10. The image processing method of claim 9, wherein:
the distance measuring step further comprises a feature point position storing step for storing feature point position information indicating the positions of the feature point determined in the feature point detecting step; and
when the feature point detecting step cannot detect the feature point, the pixel area determining step determines a direction in which the feature point moved out-of-frame by referring to the feature point position information and moves the positions of the pixel areas in the determined direction.

11. The image processing method of claim 9, wherein:
the distance measuring step further comprises an incident angle determining step for determining angles at which light from the object is incident on the wide angle lenses, responsive to the positions of the feature point determined in the feature point detecting step; and the distance calculating step for calculating the distance to the object on a basis of the angles of incidence determined in the incident angle determining step.

12. The image processing method of claim 11, wherein:

the image capturing step further comprises a step of capturing the images through imaging devices that receive light that has passed through the wide angle lenses; and the incident angle determining step calculates distances between centers of image planes of the imaging devices and the positions of the feature point detected in the feature point detecting step, and determines the angles of incidence corresponding to the calculated distances by referring to numeric information indicating angles of incidence of light from the object that has passed through centers of the wide angle lenses for different distances from the centers of the image planes.

* * * * *